Dec. 20, 1966　　　A. N. CHIRICO　　　3,292,999
CRYSTALLIZER WITH BAFFLED RECIRCULATION FLOW
Filed April 29, 1963
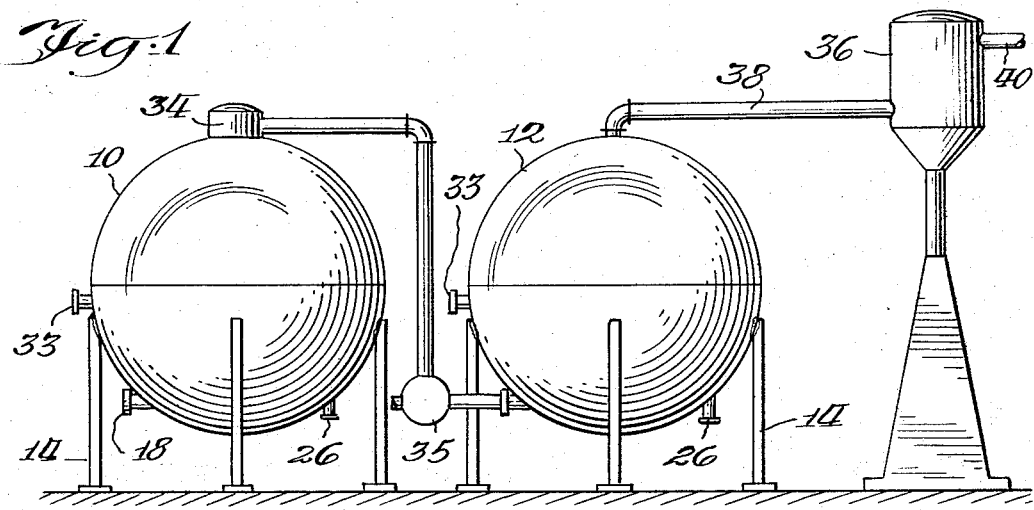
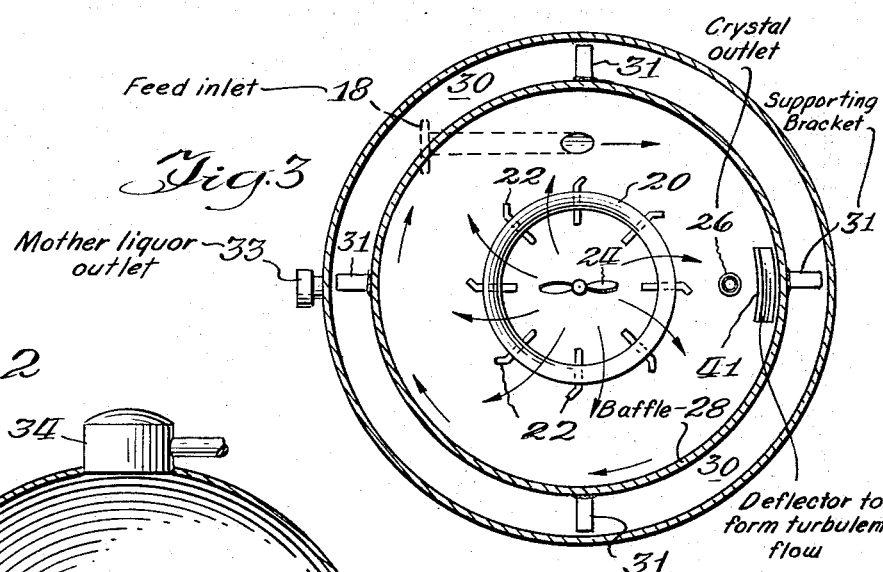
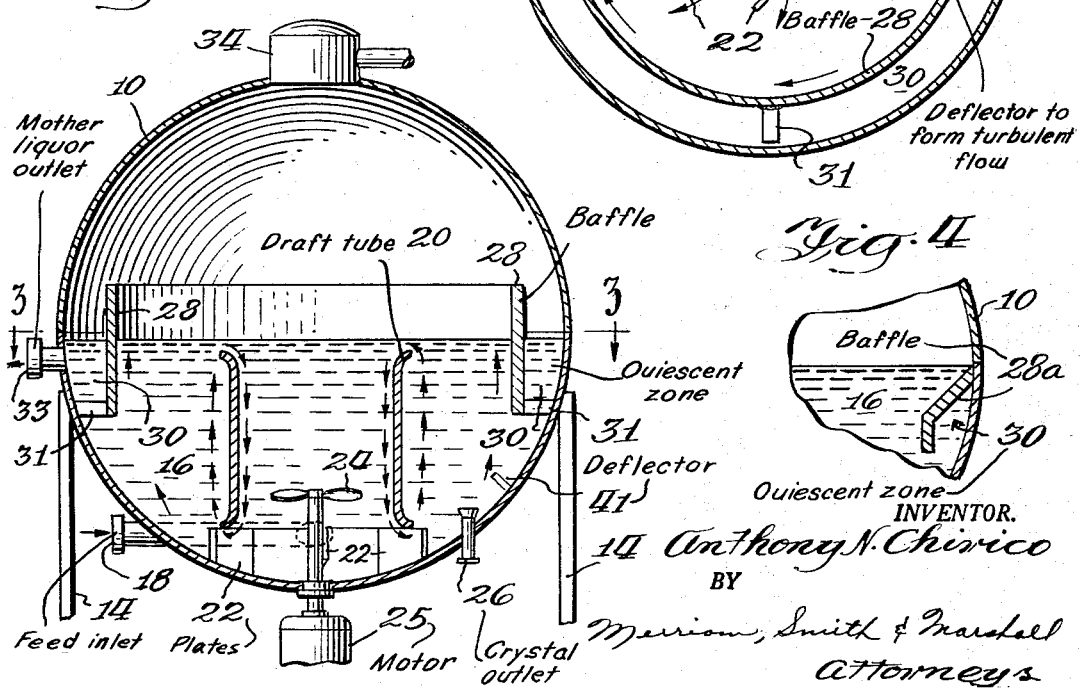
INVENTOR.
Anthony N. Chirico
BY
Morrison, Smith & Marshall
Attorneys United States Patent Office 3,292,999
Patented Dec. 20, 1966

3,292,999
CRYSTALLIZER WITH BAFFLED RECIRCULATION FLOW
Anthony N. Chirico, Naperville, Ill., assignor to Chicago Bridge & Iron Company, Oak Brook, Ill., a corporation of Illinois
Filed Apr. 29, 1963, Ser. No. 276,474
4 Claims. (Cl. 23—273)

This invention relates to a crystallization process and apparatus for producing crystals or crystalline material. In its more specific aspect, the invention relates to a process and apparatus for producing crystalline material under controlled conditions of operation and in such a manner that a high yield of large product crystals is produced.

In the chemical process industry, crystallization is an important unit operation, and offers a practical and economical procedure for obtaining concentrated chemical materials in a purified form and in a condition for efficient handling, packaging and storing.

Crystallization is generally regarded as a means for separating chemical solutes from their solutions, and more technically defined as precipitating non-amorphous solids from solutions that are saturated beyond their normal limits of solubility. Crystallization is generally regarded as a two step process, viz, nucleation, and growth of the nucleus, which processes are regarded as occurring together.

In order to induce crystallization, supersaturation of the solute in the mother liquor is required. This creates an unbalanced condition or system which serves as a driving force to precipitate crystal nuclei and to effect growth of the crystals. Several means are employed to accomplish the requisite state of supersaturation of solution, and, depending on the method, suitable equipment has been developed for effecting crystallization. One of the more important means, from an operational and economical standpoint, is one wherein supersaturation is produced by adiabatic evaporation and cooling. In this method, employing suitable crystallization equipment, a hot liquid feed solution is introduced to the crystallizer which is maintained under a subatmospheric pressure. The feed solution is introduced to the crystallizer in such a way that the solution reaches the surface of the liquid. Under the operating conditions employed, the feed solution will, by means of equilibrium flash vaporization, spontaneously adiabatically cool to the boiling temperature corresponding to the subatmospheric pressure existing in the vessel and will reach equilibrium with respect to the vapor in the crystallizer. The resultant cooling and evaporation of some of the solvent will produce crystallization. Although this method has achieved wide application in the industry, it does not provide the most advantageous and efficient means for producing uniformly large product crystals.

In accordance with the present invention, I provide a method and apparatus for producing optimum growth conditions thereby forming uniformly large product crystals. Broadly, my invention involves introducing hot feed solution to the crystallizer at or near the bottom of the vessel through suitable inlet means, which is preferably offset or nonradially oriented with respect to the crystallizer vessel. The crystallizer vessel is provided with a suitable open ended tubular member, commonly referred to as a draft tube, located axially in the vessel and within the intermediate region of the vessel. The draft tube is supported at its base by a plurality of radially disposed vertical plate members at the bottom of the crystallizer vessel. Suitable pumping means is provided for inducing fluid flow of solution downwardly through the draft tube and outwardly from the bottom thereof for recirculation. The stream, upon recirculation from the draft tube, contacts the vertical plate members which deflects the flow thereby generating a swirling or helical flow pattern in an upward direction. Further, the feed stream, being introduced tangentially, contributes to the rotating action. In this manner, the upwardly helical flow pattern of solution is generated circumferentially of the downwardly moving stream. When the upwardly, helical stream reaches the surface, the solution will adiabatically cool, as described above. Upon equilibrium flash vaporization, the solution becomes super-saturated and crystallization occurs. The resultant solution containing crystalline material is drawn quickly down through the draft tube by the pumping means and returned to the main body of solution. Here it is admixed intimately with feed solution, and recirculated to the surface.

It can be demonstrated that in a swirling or rotating liquid stream, crystals suspended in the stream will migrate toward the center of the swirl. In accordance with my invention, the crystals suspended in solution are lifted upwardly by the helical stream generated by the pumping means and vertical plate members. Because of the circumferential flow pattern, the crystals suspended in solution migrate to the center of the stream and thereby take considerably longer to travel to the surface. That is, the circumferential flow pattern increases substantially the contact time of the crystals with the supersaturated solution. This promotes crystal growth, and as the relatively more fine particles move upwardly, they increase sufficiently in size whereby they tend to move downwardly countercurrent to the upwardly helical stream. As a result of the increased retention time of crystals in solution, optimum growth conditions are promoted, and further short-circuiting of the supersaturated solution is prevented.

A suitable outlet means is provided in the bottom portion of the crystallizer vessel for removal of magma comprising a slurry of product crystals suspended in mother liquor. The magma is then treated by conventional means for recovery of the product crystals, and the mother liquor may be recirculated for further use in the process.

In order to maintain the operation under relatively constant conditions and to operate at relatively constant rates, it is necessary to withdraw mother liquor from the crystallizer vessel. It is desirable that the liquor withdrawn from the crystallizer vessel contain a minimum of solute or be substantially free of solute. To accomplish this, the vessel is provided with an internal baffle located at or near the surface of the solution, and preferably near the peripheral equator of the vessel, thereby defining a zone between the baffle and the internal wall of the vessel for containing solution. The zone is relatively quiescent as compared with the remaining body of solution and therefore is relatively free of crystalline material. The zone is provided with suitable outlet means for withdrawing mother liquor from the crystallizer vessel.

In order to describe the invention in greater detail, reference is now made to the accompanying drawings illustrating a preferred embodiment of my invention.

FIGURE 1 is an elevational view illustrative of a multi-stage crystallization system wherein the process vessels of this invention are employed.

FIGURE 2 is a vertical sectional view through a crystallizer vessel constructed in accordance with the present invention.

FIGURE 3 is a plan view on line 3—3 of FIGURE 2.

FIGURE 4 is a partial showing of a view similar to FIGURE 2 to illustrate an alternate arrangement for the baffle employed in the vessel.

Referring to the drawings wherein like reference numerals designate similar parts throughout, there is illustrated a crystallization section of a multiple stage crystallization system employing crystallizer vessels 10 and 12. In addition, there is employed auxiliary equipment (not shown) which is used in the recovery of the crystals from the magma discharged from the crystallization vessel, as will be discussed in greater detail hereinbelow. These vessels are large capacity units and may range from about 50,000 to 2,000,000 gallons producing crystal yields of 50 to 2,000 tons per day, although crystallizers of a larger or smaller size may be employed. Suitable support columns 14, or other structural arrangements, are used for supporting crystallizer vessels 10 and 11.

Referring to FIGURE 2 for details of the crystallizer vessel, there is shown vessel 10 for containing solution 16. As illustrated, the crystallizer vessels are sphere-like, that is substantially spherical or spheroidal, as described in my co-pending application U.S. Serial No. 186,733, entitled, "Chemical Processing Apparatus." This structure provides two distinct advantages. First, during normal operations, about one-half the capacity of the tank is occupied by solution, or, with a sphere-like vessel, the vessel is filled with solution approximately to the equator belt. The zone within the vessel above the surface of the solution provides a vapor release area. During equilibrium flash vaporization, liquor is entrained in the vapors, and salt dissolved in the entrained liquor is deposited on the internal walls of the vessel. The salt deposit gradually accumulates, and necessitates interrupting operations periodically to remove the salt build-up. The problem of salt build-up is minimized by providing a substantially spherical or spheroidal crystallizer which gives a maximum ratio of vapor release area to volume. There is thus provided a maximum cross-sectional area at the boiling surface which improves the crystallization process by providing a large vapor release area and by reducing the amount of liquor entrained in the vapors. As the second distinct advantage, the spherical or spheroidal vessel provides maximum structural strength.

A feed inlet 18 is located in the bottom portion of the vessel for introducing heated feed to the vessel from a suitable source (not shown). Inlet 18 is offset or non-radially directed into the interior of the vessel such that when the feed system is introduced to the vessel, a swirling action is generated. The intermediate region of crystallizer vessel 10 is provided with an open-ended tubular member 20, commonly referred to as a draft tube, which is supported at its base by a plurality of vertical plate members 22. The tube is axially disposed in the vessel along the vertical axis, and extends upwardly for a length substantially less than the depth of the vessel such that, during operation, the draft tube is completely submerged by the solution. Where desired, the draft tube 20 may be flared at the top and bottom, and/or may be provided with a reduced cross-section or throat near the bottom thereof. The vertical plate members 22 are disposed radially relative to the draft tube, and are secured at their bottom marginal edges to the vessel wall by suitable means (not shown). The face of each plate member is bent laterally, preferably at a 45° angle, to assist in generating a swirling stream. There is shown in the drawings eight plate members spaced equidistance, but a larger or smaller member may be used.

Suitable pumping means is provided for inducing fluid flow of the solution downwardly through the draft tube 20. This may be accomplished, for example, by impeller blade 24 arranged near the bottom of the draft tube. The impeller blade may be driven by a suitable motor means indicated at 25.

The crystallizer vessel is provided with an outlet 26 at the bottom portion thereof for withdrawing magma comprising a slurry of product crystals in mother liquor. Spaced a suitable distance, e.g., 1½ to 2 feet, above outlet 26 is deflector means 41 which causes a turbulent flow of the magma near the outlet zone prior to magma withdrawal. A suitable deflector means consists of a preferably curved plate having an arcuate length of about two to three feet, the plate extending at a right angle for about one to two feet from the wall of vessel 10 to which it is attached in any suitable manner. Following withdrawal of the magma, it is then directed to a suitable recovery means, such as a centrifuge (not shown), for recovering the product crystals. The mother liquor separated therefrom may be recirculated to the system for further use.

Annular baffle 28 is arranged within the crystallizer vessel for defining an annular zone 30 between the baffle and the wall of the vessel for containing a portion of the solution. The baffle may be secured to the wall of the vessel by suitable bracket means 31. In one embodiment, baffle 28 is concentrically arranged relative to the vessel wall and also preferably to the tubular member 20, and baffle 28 may intersect the equator of the vessel such that the marginal edges of the baffle terminate above and below the liquid-vapor interface.

In the modification shown in FIGURE 4, internal baffle 28a extends inwardly from the wall of the vessel and downwardly, and the marginal edge of the baffle is connected to the vessel wall at the equator. The baffle 28a is thus completely submerged by the liquid in the vessel. This modification is particularly advantageous in that the baffle may be connected or joined to the vessel wall by relatively simple means, and further affords increased surface area for evaporation.

By means of the baffle, solution contained within annular zone 30 is relatively more quiescent as compared to the remaining body of solution. As a consequence, crystalline material in this zone readily settles and returns to the main body of solution. The annular zone is provided with an outlet 33 for withdrawing mother liquor from the vessel.

In operation, hot feed solution is introduced to the vessel 10 tangentially by means of inlet 18. The stream admixes intimately with the stream returned by the draft tube 20, and the pump means and vertical plate members generate the stream upwardly and helically, as described above. When the solution reaches the surface spontaneously, adiabatic cooling occurs thereby resulting in crystallization. The vapors from the vapor zone of the crystallizer vessel 10 are withdrawn to a catch-all type separator 34. In a multiple stage crystallization system, the heat from the vapor from the first effect crystallizer may be recovered by indirect heat exchange through heat exchanger 35 or handled similar to the vapor from the last crystallizer which is passed to a jet ejector 36 via line 38, and the condensate from ejector 36 is removed via line 40 for further processing.

The supersaturated solution at the surface in crystallizer vessel 10 is withdrawn downwardly through draft tube 20 and returned to the main body of the solution for recirculation. As explained above, the crystals migrate toward the center of the upwardly helical stream. The heavy crystals settle countercurrently to the stream thereby promoting crystal growth. The product crystals are removed at the bottom of the vessel through outlet 26, and are passed to a recovery unit (not shown) for separation from the mother liquor. The system is operated on a continuous basis at a relatively constant rate by withdrawing liquor from the annular zone 30 through outlet 33.

As a further advantage of the invention, I provide inlet means which is non-radially directed into the interior of the vessel. The feed stream is introduced at the bottom of the vessel tangentially with relation to the recirculated solution and admixed intimately therewith. The temperature of the feed stream is higher than that of the recirculated solution. As a consequence, the temperature of the solution being recirculated, upon admixing with the feed stream, rises thereby suppressing nucleation. It thus will be observed that the solution of the downwardly moving zone is relatively more supersaturated than the solution of the upwardly, helical stream.

In addition to the several advantages enumerated above, it will be observed that the pumping means is made integral with the crystallizer vessel thereby eliminating the conventional external circulation system. Further, my invention is readily adaptable for handling a wide variety of materials, including for example sugar, salt, urea, ammonium nitrate, potassium chlorides, alkali metal borates, etc. In a desired construction, the crystallizer vessel may have a diameter of 30 feet and the draft tube a diameter of 10 feet. The vertical plate members may have a total length of 2 feet with the draft tube supported by the plates at about midpoint.

Although the foregoing invention has been described with reference to certain illustrative embodiments, it is evident that modifications and variations can be made by those skilled in the art to which the instant invention pertains.

What is claimed is:

1. A crystallizer comprising:
   (a) a vessel for containing a solution of a solute to be crystallized therefrom;
   (b) an open-ended tubular member disposed vertically in said vessel;
   (c) a plurality of vertical plate members disposed in the bottom portion of said vessel beneath the tubular member and extending outwardly beyond the edge of said tubular member, said vertical plate members having an obtuse bend along the horizontal plane and outer edges spaced from the vessel walls;
   (d) means for inducing fluid flow of solution downwardly through said tubular member and outwardly against said bent vertical plates to cause swirling of solution in an upward direction around the tubular member;
   (e) a feed inlet for said vessel positioned adjacent the bottom of said tubular member and nonradially oriented with respect to said vessel to direct a feed stream in the same rotating direction around the tubular member as solution directed outwardly by the bent vertical plates;
   (f) a magma outlet in the bottom portion of said vessel; and
   (g) a liquor outlet in a liquid zone of the vessel.

2. A crystallizer comprising:
   (a) a substantially spherical vessel for containing a solution of a solute to be crystallized therefrom;
   (b) an open-ended tubular member disposed axially in said vessel along the vertical axis;
   (c) a plurality of vertical plate members disposed in the bottom portion of said vessel radially arranged relative to said tubular member and extending outwardly beyond the edge of said tubular member, the marginal edge of said tubular member being supported by said vertical plate members, said vertical plate members having an obtuse bend along the horizontal plane and outer edges spaced from the vessel walls;
   (d) means for inducing fluid flow of solution downwardly through said tubular member and outwardly against said bent vertical plates to cause swirling of solution in an upward direction around the tubular member;
   (e) a feed inlet for said vessel positioned adjacent the bottom of said tubular member and nonradially oriented with respect to said vessel to direct a feed stream in the same rotating direction around the tubular member as solution directed outwardly by the bent vertical plates;
   (f) an annular baffle concentrically arranged within said vessel defining an annular liquid zone between said baffle and the wall of said vessel;
   (g) a magma outlet in the bottom portion of said vessel; and
   (h) a liquor outlet in said liquid zone.

3. A crystallizer comprising:
   (a) a vessel for containing a solution of a solute to be crystallized therefrom;
   (b) an open-ended tubular member disposed vertically in said vessel;
   (c) a plurality of vertical plate members disposed in the bottom portion of said vessel beneath the tubular member and extending outwardly beyond the edge of said tubular member, said vertical plate members having an obtuse bend along the horizontal plane and outer edges spaced from the vessel walls;
   (d) means for inducing fluid flow of solution downwardly through said tubular member and outwardly against said bent vertical plates to cause swirling of solution in an upward direction around the tubular member;
   (e) a feed inlet for said vessel positioned adjacent the bottom of said tubular member;
   (f) a magma outlet in the bottom portion of said vessel; and
   (g) a liquor outlet in a liquid zone of the vessel.

4. A crystallizer according to claim 2 wherein said baffle comprises an annular ring having both marginal edges spaced from the vessel wall with the top edge of the ring being above, and the bottom edge of the ring being below, the liquid level of solution in said vessel.

References Cited by the Examiner

UNITED STATES PATENTS

| | | | |
|---|---|---|---|
| 286,369 | 10/1883 | Babbitt | 159—16 |
| 1,215,140 | 2/1917 | Miller | 159-2 |
| 1,860,118 | 5/1932 | Ray | 23—273 |
| 1,945,281 | 1/1934 | Leithauser | 159—45 |
| 2,130,065 | 9/1938 | Burke | 23—273 X |
| 2,375,922 | 5/1945 | Jeremiassen | 23—295 |
| 2,383,763 | 8/1945 | Bloch et al. | 23—295 |
| 2,435,898 | 2/1948 | Otto | 23—273 X |
| 2,827,366 | 3/1958 | Baeman | 23—273 |
| 2,856,270 | 10/1958 | Saeman | 23—273 |
| 2,922,701 | 1/1960 | Ratje | 23—273 |
| 3,023,090 | 2/1955 | Kolner | 23—273 |

OTHER REFERENCES

Newman et al., Chemical Engineering Progress, vol. 55, No. 3, March 1959, pages 65 to 70.

NORMAN YUDKOFF, *Primary Examiner.*

S. J. EMERY, A. J. ADAMCIK, *Assistant Examiners.*